June 4, 1929.  F. CUÉNOD  1,715,817
FOLDABLE SLED
Filed Nov. 28, 1927

Inventor
F. Cuénod
by Jo. Lawrie
Atty

Patented June 4, 1929.

1,715,817

UNITED STATES PATENT OFFICE.

FERNAND CUÉNOD, OF LIEGE, BELGIUM.

FOLDABLE SLED.

Application filed November 28, 1927, Serial No. 236,272, and in Belgium September 12, 1927.

This invention relates to a bobsleigh adapted to be used with skis to allow travel over fields.

An object of the invention is to provide a portable sleigh which may be attached to a pair of skis and which is collapsible so that it may be carried on a person's back.

A further object is to provide a means for steering or braking the bobsleigh while the person is sitting in the seat.

The invention is illustrated in the accompanying drawing in which:—

Figure 1:
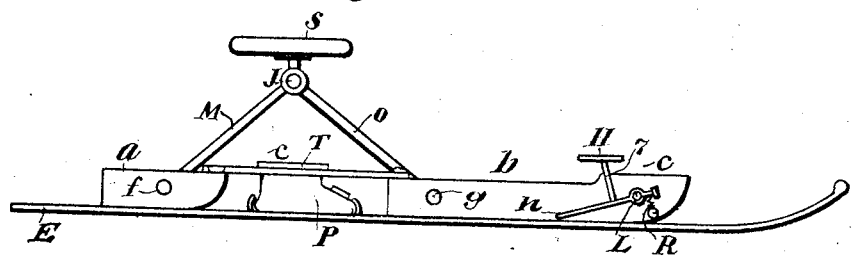
Figure 2:
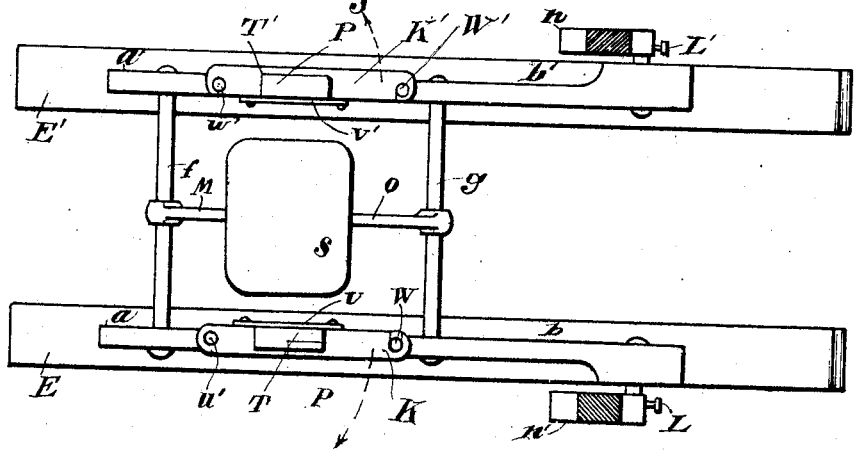

Figure 1 is a side elevation.
Figure 2 is a top plan view.

The bobsleigh comprises a pair of rear runners $a$—$a'$ and a pair of front runners $b$—$b'$. These runners $a$—$b$ are connected by a link K which is pivoted to the runner $a$ by the pin $u$ and which engages a pin $w$ on the runner $b$ thereby locking the runners $a$—$b$ together. In a similar manner the runners $a'$—$b'$ are connected by a link K' by pins $u'$ and $w'$. Connecting the rear runners $a$—$a'$ is a transverse bar $f$ while the front runners $b$—$b'$ are similarly connected by a bar $g$. The bars pass through the runners and are secured by heads although the runners may slide toward one another on the said bars. Pivotally connected to the bar F is a bar M while the bar $g$ has pivotally connected to it the bar O. These bars M and O are brought together between the bars F and G and pivotally secured by a pin J. Supported at this pivotal point J is a seat S. The links K—K' have cut out portions which are adjusted to receive the upper parts of shoes P—P' which are secured to skis E—E. The shoes are either wooden or metallic and have an upper plate T—T' which is adapted to engage the surface of the links K—K' sidewise movement of the shoes being prevented by the hook links $v$—$v'$ which are pivotally connected at one end to the links K—K' and extend across the cut out portions and engage a pin on each of the said links.

To allow steering and braking, two pedals H—H' are supported at the fore part of the front runners B—B'. These pedals actuate paddles $n$ and $n'$ which are pivoted to the front runners B—B' by pins L—L' thru the rod 7 and 7'. Springs R—R' tend to hold the paddles $n$ and $n'$ in inoperative position.

In operation the device is set upon a pair of skis and secured by the shoes P—P' engaging the links K—K' as described. The actuation of the brakes for steering is obvious, it being necessary to depress the right pedal when a right turn is wanted and the left pedal when a left turn is wanted, both pedals being used simultaneously to brake the sleigh.

When it is desired to use only the skis the sled may be removed by releasing the links $v$—$v'$ and sliding the sleigh sidewise away from the skis and thereby moving the shoes out of the recess in the links K—K'. To fold the sled so that it may be more easily carried the links $k$ are swung on their pivots $u$—$u'$ the rods M and O straightened thereby bring the seat to the level of the runners and the entire rear runners pivoted on the rod G and brought down on the front runners. It is also possible to move the runners inwardly toward each other on the rods G and F to make a more easily packed sleigh. The skis are then ready for individual use.

What is claimed is:—

1. A sleigh including a pair of rear runners, a pair of front runners, detachable links connecting the front and rear runners, a transverse bar connecting the rear runners, a second transverse bar connecting the front runners whereby the rear runners may be pivoted on the second transverse bar and folded onto the front runners.

2. A sleigh including a pair of rear runners, a pair of front runners, detachable links connecting the front and rear runners, a transverse bar connecting the rear runners, a second transverse bar connecting the front runners, whereby the rear runners may be pivoted on the second transverse bar and folded onto the front runners, and a seat carried on the transverse bars.

3. A sleigh including a pair of rear runners, a pair of front runners, detachable links connecting the front and rear runners, a transverse bar connecting the rear runners, a second transverse bar connecting the front runners, whereby the rear runners may be pivoted on the second transverse bar and folded on the front runner, a seat carried on the transverse bars and means for steering and braking the sleigh.

In testimony whereof I affix my signature.

FERNAND CUÉNOD.